US006909691B1

(12) United States Patent
Goyal et al.

(10) Patent No.: US 6,909,691 B1
(45) Date of Patent: Jun. 21, 2005

(54) FAIRLY PARTITIONING RESOURCES WHILE LIMITING THE MAXIMUM FAIR SHARE

(75) Inventors: Pawan Goyal, Mountain View, CA (US); Srinivasan Keshav, Mountain View, CA (US)

(73) Assignee: Ensim Corporation, Sunnyvale, CA (US)

(*) Notice: Subject to any disclaimer, the term of this patent is extended or adjusted under 35 U.S.C. 154(b) by 705 days.

(21) Appl. No.: 09/633,575

(22) Filed: Aug. 7, 2000

(51) Int. Cl.[7] .................................................. H04J 1/16
(52) U.S. Cl. ........................ 370/230; 370/235; 370/412; 370/428; 709/226; 709/229
(58) Field of Search ................................. 370/230, 235, 370/236, 236.1, 252, 395.2, 395.21, 395.4, 395.41–395.43, 468, 443, 428, 412; 709/226, 229, 102–104, 234; 711/173, 104

(56) References Cited

U.S. PATENT DOCUMENTS

| 3,377,624 A | | 4/1968 | Nelson et al. |
| 4,177,510 A | | 12/1979 | Appell et al. ............... 364/200 |
| 5,189,667 A | * | 2/1993 | Esaki et al. .................. 370/389 |

(Continued)

FOREIGN PATENT DOCUMENTS

WO     WO 99/39261     8/1999

OTHER PUBLICATIONS

"Start–time Fair Queuing: A Scheduling Algorithm for Integrated Services Packet Switching Networks" by Goyal et al.*
http://cs.cornell.edu/Info/Courses/Spring–97/CS614/goy.html; 'Notes on "A Heirarchical CPU Scheduler for Multimedia Operating Systems"' by Pawan Goyal, Xingang Guo and Harrick Vin—written by: Tibor Jánosi (retrieved on May 8, 2000).*

'Packet Scheduling Algorithms for Integrated Services Networks' by Pawan Goyal, M.S., BTech.; Dissertation . . . presented . . . Doctor of Philosophy @ The University of Texas at Austin; Aug. 1997.*

IEEE/ACM Transactions on Networking, vol. 5, No. 5, pp. 690–704 (Oct. 1997).

Plummer, D. C., *An Ethernet Address Resolution Protocol—or—Converting Network Protocol Addresses to 48.bit Ethernet Address for Transmission on Ethernet Hardware*, Nov. 1982, [online], [retrieved on Jan. 17, 2000]. Retrieved from the Internet: <URL: http://www.msg.net/kadow/answers/extras/rfc/rfc826.txt>.

(Continued)

*Primary Examiner*—Brian Nguyen
*Assistant Examiner*—Ian N Moore
(74) *Attorney, Agent, or Firm*—Fenwick & West LLP

(57) ABSTRACT

Resource requests from a plurality of schedulable entities are scheduled while limiting the maximum and minimum quality of service allocated to each schedulable entity. The resource scheduler of the present invention requires less memory maintain state information than existing rate-controlling schedulers, and is thus more easily scalable to large numbers of users. The resource scheduler also schedules resources fairly among competing schedulable entities. A fair-share scheduling algorithm is used by a resource scheduler to select resource requests to service. A rate controller checks to ensure that servicing the selected request will not cause the associated user's maximum quality of service to be exceeded. If the maximum quality of service will not be exceeded, the virtual time used in the scheduling algorithm is incremented, and the request is serviced. If the maximum quality of service will be exceeded, the virtual time is still incremented, but the request is not serviced and remains pending.

3 Claims, 3 Drawing Sheets

U.S. PATENT DOCUMENTS

| | | | |
|---|---|---|---|
| 5,212,793 A | 5/1993 | Donica et al. | |
| 5,226,160 A | 7/1993 | Waldron et al. | |
| 5,249,290 A | 9/1993 | Heizer | |
| 5,263,147 A | 11/1993 | Francisco et al. | 395/425 |
| 5,325,530 A | 6/1994 | Mohrmann | |
| 5,437,032 A | 7/1995 | Wolf et al. | |
| 5,528,753 A | 6/1996 | Fortin | |
| 5,572,680 A | 11/1996 | Ikeda et al. | |
| 5,584,023 A | 12/1996 | Hsu | |
| 5,603,020 A | 2/1997 | Hashimoto et al. | 395/616 |
| 5,623,492 A * | 4/1997 | Teraslinna | 370/397 |
| 5,636,371 A | 6/1997 | Yu | 395/500 |
| 5,640,595 A | 6/1997 | Baugher et al. | |
| 5,692,047 A | 11/1997 | McManis | 380/4 |
| 5,706,097 A | 1/1998 | Schelling et al. | 358/296 |
| 5,706,453 A | 1/1998 | Cheng et al. | |
| 5,708,774 A | 1/1998 | Boden | |
| 5,719,854 A | 2/1998 | Choudhury et al. | |
| 5,727,203 A | 3/1998 | Hapner et al. | |
| 5,748,614 A * | 5/1998 | Wallmeier | 370/395.41 |
| 5,752,003 A | 5/1998 | Hart | |
| 5,761,477 A | 6/1998 | Wahbe et al. | 395/406 A |
| 5,764,889 A | 6/1998 | Ault et al. | |
| 5,781,550 A | 7/1998 | Templin et al. | 370/401 |
| 5,799,173 A | 8/1998 | Gossler et al. | |
| 5,809,527 A | 9/1998 | Cooper et al. | 711/133 |
| 5,828,893 A | 10/1998 | Weid et al. | 395/800 |
| 5,838,686 A * | 11/1998 | Ozkan | 370/433 |
| 5,838,916 A | 11/1998 | Domenikos et al. | 395/200.49 |
| 5,842,002 A | 11/1998 | Schnurer et al. | 395/500 |
| 5,845,129 A | 12/1998 | Wendorf et al. | 395/726 |
| 5,850,399 A * | 12/1998 | Ganmukhi et al. | 370/412 |
| 5,860,004 A | 1/1999 | Fowlow et al. | |
| 5,864,683 A | 1/1999 | Boebert et al. | |
| 5,889,956 A * | 3/1999 | Hauser et al. | 709/226 |
| 5,889,996 A | 3/1999 | Adams | |
| 5,892,968 A | 4/1999 | Iwasaki et al. | |
| 5,905,730 A * | 5/1999 | Yang et al. | 370/429 |
| 5,905,859 A | 5/1999 | Holloway et al. | |
| 5,913,024 A | 6/1999 | Green et al. | 395/186 |
| 5,915,085 A | 6/1999 | Koved | 395/186 |
| 5,915,095 A | 6/1999 | Miskowiec | |
| 5,918,018 A | 6/1999 | Gooderum et al. | 395/200.55 |
| 5,920,699 A | 7/1999 | Bare | |
| 5,933,603 A | 8/1999 | Vahalia et al. | |
| 5,937,159 A | 8/1999 | Meyers et al. | 395/187.01 |
| 5,956,481 A | 9/1999 | Walsh et al. | 395/186 |
| 5,978,373 A | 11/1999 | Hoff et al. | |
| 5,982,748 A * | 11/1999 | Yin et al. | 370/232 |
| 5,987,524 A | 11/1999 | Yoshida et al. | |
| 5,991,812 A * | 11/1999 | Srinivasan | 709/232 |
| 5,999,963 A | 12/1999 | Bruno et al. | |
| 6,016,318 A | 1/2000 | Tomoike | |
| 6,018,527 A * | 1/2000 | Yin et al. | 370/395.41 |
| 6,023,721 A | 2/2000 | Cummings | 709/201 |
| 6,038,608 A | 3/2000 | Katsumata | |
| 6,038,609 A | 3/2000 | Geulen | |
| 6,047,325 A | 4/2000 | Jain et al. | |
| 6,055,617 A | 4/2000 | Kingsbury | |
| 6,061,349 A | 5/2000 | Coile et al. | |
| 6,065,118 A | 5/2000 | Bull et al. | 713/200 |
| 6,075,791 A * | 6/2000 | Chiussi et al. | 370/412 |
| 6,075,938 A | 6/2000 | Bugnion et al. | 395/500.48 |
| 6,078,929 A | 6/2000 | Rao | |
| 6,078,957 A | 6/2000 | Adelman et al. | |
| 6,086,623 A | 7/2000 | Broome et al. | |
| 6,092,178 A | 7/2000 | Jindal et al. | |
| 6,094,674 A | 7/2000 | Hattori et al. | |
| 6,101,543 A | 8/2000 | Alden et al. | |
| 6,108,701 A | 8/2000 | Davies et al. | |
| 6,108,759 A | 8/2000 | Orcutt et al. | 711/173 |
| 6,122,673 A * | 9/2000 | Basak et al. | 709/238 |
| 6,154,776 A | 11/2000 | Martin | |
| 6,154,778 A | 11/2000 | Koistinen et al. | |
| 6,161,139 A | 12/2000 | Win et al. | |
| 6,167,520 A | 12/2000 | Touboul | 713/200 |
| 6,172,981 B1 | 1/2001 | Cox et al. | |
| 6,189,046 B1 | 2/2001 | Moore et al. | |
| 6,192,389 B1 | 2/2001 | Ault et al. | 709/101 |
| 6,192,512 B1 | 2/2001 | Chess | 717/5 |
| 6,230,203 B1 | 5/2001 | Koperda et al. | |
| 6,240,463 B1 | 5/2001 | Benmohamed et al. | |
| 6,247,057 B1 | 6/2001 | Barrera | |
| 6,259,699 B1 * | 7/2001 | Opalka et al. | 370/398 |
| 6,266,678 B1 | 7/2001 | McDevitt et al. | |
| 6,269,404 B1 | 7/2001 | Hart et al. | |
| 6,279,039 B1 | 8/2001 | Bhat et al. | |
| 6,279,040 B1 | 8/2001 | Ma et al. | |
| 6,282,581 B1 | 8/2001 | Moore et al. | |
| 6,282,703 B1 | 8/2001 | Meth et al. | |
| 6,286,047 B1 | 9/2001 | Ramanathan et al. | |
| 6,298,479 B1 | 10/2001 | Chessin et al. | |
| 6,314,558 B1 | 11/2001 | Angel et al. | |
| 6,327,622 B1 | 12/2001 | Jindal et al. | |
| 6,336,138 B1 | 1/2002 | Caswell et al. | |
| 6,351,775 B1 | 2/2002 | Yu | |
| 6,353,616 B1 | 3/2002 | Elwalid et al. | |
| 6,363,053 B1 | 3/2002 | Schuster et al. | |
| 6,370,583 B1 | 4/2002 | Fishler et al. | |
| 6,381,228 B1 * | 4/2002 | Prieto et al. | 370/323 |
| 6,385,638 B1 | 5/2002 | Baker-Harvey | |
| 6,389,448 B1 | 5/2002 | Primak et al. | |
| 6,393,484 B1 | 5/2002 | Massarani | |
| 6,425,003 B1 | 7/2002 | Herzog et al. | |
| 6,430,622 B1 | 8/2002 | Aiken, Jr. et al. | |
| 6,434,631 B1 | 8/2002 | Bruno et al. | |
| 6,434,742 B1 | 8/2002 | Koepele, Jr. | |
| 6,438,134 B1 * | 8/2002 | Chow et al. | 370/412 |
| 6,442,164 B1 * | 8/2002 | Wu | 370/395.21 |
| 6,457,008 B1 * | 9/2002 | Rhee et al. | 707/10 |
| 6,463,459 B1 | 10/2002 | Orr et al. | |
| 6,470,398 B1 | 10/2002 | Zargham et al. | |
| 6,487,578 B2 | 11/2002 | Ranganathan | |
| 6,487,663 B1 | 11/2002 | Jaisimha et al. | |
| 6,490,670 B1 * | 12/2002 | Collins et al. | 711/173 |
| 6,499,137 B1 | 12/2002 | Hunt | |
| 6,529,950 B1 | 3/2003 | Lumelsky et al. | |
| 6,542,167 B1 | 4/2003 | Darlet et al. | |
| 6,553,413 B1 | 4/2003 | Leighton et al. | |
| 6,578,055 B1 | 6/2003 | Hutchison et al. | |
| 6,578,068 B1 | 6/2003 | Bowman-Amuah | |
| 6,580,721 B1 * | 6/2003 | Beshai | 370/428 |
| 6,658,571 B1 | 12/2003 | O'Brien et al. | |
| 6,691,312 B1 | 2/2004 | Sen et al. | |
| 2003/0061338 A1 * | 3/2003 | Stelliga | 709/224 |

OTHER PUBLICATIONS

Huang, X. W. et al., "The ENTRAPID Protocol Development Environment," *Proceedings of IEEE Infocom'99*, Mar. 1999, nine pages.

Duffield, N.G., et al., "A Flexible Model for Resource Management in Virtual Private Networks," *Computer Communication Review Conference, Computer Communication*, ACM SIGCOMM '99 Conference, Cambridge, MA, Aug. 30, 1999–Sep. 3, 1999. pp 95–108.

Campbell, A. T. and Keshav, S., "Quality of Service in Distributed Systems," *Computer Communications 21*, 1998, pp 291–293.

Bach, M. J., *The Design of the Unix® Operating System*, New Delhi, Prentice–Hall of India, 1989, pp v–x, 19–37.

McDougall, R., et al., *Resource Management*, Upper Saddle River, NJ, Prentice Hall, 1999, pp iii–xix, 135–191.

Rijsinghani, A., RFC 1624, May 1994, [online], [retrieved Feb. 2, 2000]. retrieved from the Internet: <URL: http://www.faqs.org/rfcs/rfc1624.html>.

Mallory, T and Kullberg, A., RFC 1141, Jan. 1990 [online], [retrieved Feb. 2, 2000]. retrieved from the Internet: <URL: http://www.faqs.org/rfcs/rfc1141.html>.

Egevang, K. and Francis P., RFC 1631, May 1994 [online], [retrieved Feb. 2, 2000]. retrieved from the Internet: <URL: http://www.faqs.org/rfcs/rfc1631.html>.

Keshav, S., *An Engineering Approach to Computer Networking: ATM Networks, the Internet, and the Telephone Network*, Reading, MA, Addison–Wesley, 1997, pp vii–xi, 85–115, 209–355, 395–444.

Stevens, R. W., *UNIX Network Programming Volume 1 Networking APIs: Sockets and XTI*, Upper Saddle River, NJ, Prentice Hall, 1998, pp v–xiv, 29–53, 85–110, 727–760.

Tanebaum, A. S. and Woodhull, A. S., *Operating Systems: Design and Implementation*, Upper Saddle River, NJ, Prentice Hall, 1997, pp vii–xiv, 1–46, 401–454.

Rubini, A., *LINUX Device Drivers*, Sebastopol, CA, O'Reilly & Associates, Inc., 1998, pp v–x, 13–40.

Goyal, P., et al., "A Hierarchical CPU Scheduler for Multimedia Operating Systems," *Proceedings of the Second Symposium on Operating Systems Design and Implementations (OSDI'96)*, Seattle, WA, Oct. 1996, 15 pages.

Laurie, B. and Laurie, P., *Apache The Definitive Guide*, Sebastopol, CA, O'Reilly & Associates, Inc., Feb. 1999, pp v–viii, 43–74.

Aho, A. V. and Ullman J. D., *Principles of Complier Design*, Reading, MA, 1977, pp vii–x, 359–362, 519–522.

Jonsson, J., "Exploring the Importance of Preprocessing Operations in Real–Time Multiprocessor Scheduling," *Proc. of the IEEE Real–Time Systems Symposium—Work–in–Progress session*, San Francisco, CA, Dec. 4, 1997, pp 31–34.

Rusling, D. A., Processes, [online], [retrieved on Dec. 7, 1999]. Retrieved from the Internet: <URL: http://www.cebaf.gov/~saw/linux/tlk–html/node44.html>.

Rusling, D. A., Linux Processes, [online], [retrieved on Dec. 7, 1999]. Retrieved from the Internet: <URL: http://www.cebaf.gov/~saw/linux/tlk–html/node45.html>.

Rusling, D. A., Identifiers, [online], [retrieved on Dec. 7, 199]. Retrieved from the Internet: <URL: http://www.cebaf.gov/~saw/linux/tlk–html/node46.html>.

Rusling, D. A., Scheduling, [online], [retrieved on Dec. 7, 1999]. Retrieved from the Internet: <URL: http://www.cebaf.gov/~saw/linux/tlk–html/node47.html>.

Rusling, D. A., Scheduling in Multiprocessor Systems, [online], [retrieved on 12–07099]. Retrieved from the internet: <URL: http://www.cebaf.gov/~saw/linux/tlk–html/node48.html>.

Rusling, D. A., Files, [online], [retrieved on Dec. 7, 1999]. Retrieved from the Internet: <URL: http://www.cebaf.gov/~saw/linux/tlk–html/node49.html>.

Pending United States patent application entitled "Providing Quality of Service Guarantees to Virtual Hosts," U.S. Appl. No. 09/452,286, filing date Nov. 30, 1999.

Pending United States patent application entitled "Selective Interception of System Calls," U.S. Appl. No. 09/499,098, filing date Feb. 4, 2000.

Pending United States patent application entitled "Dynamic Scheduling of Task Streams in a Multiple–Resource System to Ensure Task Stream Quality of Service," U.S. Appl. No. 09/498,450, filing date Feb. 4, 2000.

Pending United States patent application entitled "Disambiguating File Descriptors," U.S. Appl. No. 09/500,212, filing date Feb. 8, 2000.

Pending United States patent application entitled "Restricting Communication Between Network Devices on a Common Network," U.S. Appl. No. 09/502,155, filing date Feb. 11, 2000.

Pending United States patent application entitled "Restricting Communication of Selected Processes to a Set of Specific Network Addresses," U.S. Appl. No. 09/503,975, filing date Feb. 14, 2000.

Pending United States patent application entitled "Enabling a Service Provider to Provide Intranet Services," U.S. Appl. No. 09/526,980, filing date Mar. 15, 2000.

Pending United States patent application entitled "Dynamically Modifying the Resources of a Virtual Server," U.S. Appl. No. 09/569,371, filing date May 11, 2000.

Pending United States patent application entitled "Regulating File Access Rates According to File Type," U.S. Appl. No. 09/572,672, filing date May 16, 2000.

Pending United States patent application entitled "Modifying Internal Components of a Running Operating System," U.S. Appl. No. 09/576,393, filing date May 22, 2000.

Pending United States patent application entitled "Associating Identifiers With Virtual Processes," U.S. Appl. No. 09/611,877, filing date Jul. 7, 2000.

Boehm, B., "Managing Software Productivity and Reuse," IEEE Computer, vol. 32, No. 9, Sep. 1999, 3 pages.

Corbato, F. J. et al. "An Experimental Timesharing System," Proceedings of the American Federation Of Information Processing Societies Spring Joint Computer Conference, San Francisco, CA, May 1–3, 1962, pp 335–344.

Deutsch, P. and Grant, C.A., "A Flexible Measurement Tool for Software Systems," Information Processing 71 (Proc. of the IFIP Congress), 1971, pp. 320–326.

Edjlali, G., et al., "History–based Access Control for Mobile Code," Fifth ACM Conference on Computer and Communication Security, Nov. 3–5, 1998, 19 pages.

Erlingsson, U. and Schneider, F. B., "SASI Enforcement of Security Policies: A Retrospective," Proc. New Security Paradigms Workshop, Apr. 2, 1999, pp 1–17.

Erlingsson, U. and Schnieder, F. B., IRM Enforcement of Java Stack Inspection, [online], Feb. 19, 2000, [retrieved on Apr. 2, 2002]. Retrieved from the Internet: <URL: http://cs–tr.cs.cornell.edu/Diens/UI2.0/Show Page/ncstrl.cornell/TR2000–1786>.

Evans, D. and Twyman, A., "Flexible Policy–Directed Code Safety," Proc. of 1999 IEEE Symposium on Security and Privacy, Oakland, CA, May 9–12, 1999, pp. 1–14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment For Untrusted Helper Applications (Confining the Wily Hacker)," Proc. of the Sixth USENIX UNIX Security Symposium, San Jose, CA, Jul. 1996, 15 pages.

Goldberg, R. P., "Survey of Virtual Machine Research," IEEE Computer, Jun. 1974, pp 34–45.

Pandey, R. and Hashii, B., "Providing Fine–Grained Access Control For Mobile Programs Through Binary Editing," Technical Report TR98 08, University of California, Davis, CA, 1998, pp 1–22.

Ritchie, D. M., "The Evolution of the UNIX Time–Sharing System," AT&T Bell Laboratories Technical Journal 63, No. 6, Part 2, Oct. 1984, (originally presented 1979), 11 pages.

Saltzer, J., H. and Schroeder, M. D., The Protection of Information in Computer Systems, [online], 1973, [retrieved on Apr. 2, 2002]. Retrieved from the Internet: <URL: http://www.cs.virginia.edu~evans/cs551/saltzer/>.

Wahbe, R., et al., "Efficient Software–Based Fault Isolation," Proc. of the Symposium on Operating System Principles, 1993, 14 pages.

Symbol Table, [online] copyright 1997, 1998, [Retrieved on Apr. 4, 2003] [Retrieved from the internet < URL: http://216.239.33.100/search?q=cache:eASXk8qC_-AC:www.caldera.com/developers/gabi/1998–04–29/ch4.s...], pp. 1–5.

\* cited by examiner-

FAIRLY PARTITIONING RESOURCES WHILE LIMITING THE MAXIMUM FAIR SHARE

BACKGROUND

1. Field of Invention

The present invention relates generally to resource scheduling, and more particularly, to scheduling a resource fairly while preventing resource users from exceeding a maximum resource allotment.

2. Background of the Invention

A resource scheduler performs the function of allocating resources. Different resource types may use separate resource schedulers. Within each resource scheduler, each customer or user of the resource is treated as a separate "schedulable entity" with a separate scheduling queue and an individual quality of service guarantee. The scheduler selects requests for service from among the different queues, using a scheduling algorithm to ensure that each queue receives a at least the minimum level of service it was guaranteed. Different queues may have different minimum quality of service guarantees, and the resource requests from each queue are weighted by the quality of service guarantee. Weighting increases or decreases a schedulable entity's relative resource share.

The goal of the resource scheduler is twofold. First, the resource scheduler must try to ensure that each schedulable entity is allocated resources corresponding to at least the minimum quality of service resource level paid for by that schedulable entity. However, if extra resources are available, the resource scheduler must decide how to allocate the additional resources. Typical resource scheduling algorithms and methods are work-conserving. A work-conserving scheduler is idle only when there is no resource request to service. Additional resources will be divided up among the schedulable entities with outstanding requests, in proportion to each schedulable entity's weight. Customer requests are serviced if the resource is available, even if they exceed the schedulable entities' quality of service guarantees.

Thus, a work-conserving resource scheduler may often provide schedulable entities with service beyond the actual maximum quality of service paid for by the schedulable entity. Unfortunately, this behavior tends to create unrealistic expectations. For example, assume customers A and B both are sharing a resource. Customer A pays for 50% of the resources and customer B pays for 25%, and resource sharing is weighted between A and B to reflect these different allocations. In a work-conserving scheduler, customers with unsatisfied request get resource shares in proportion to their weights. Therefore, if both A and B request resources beyond their paid-for quality of service guarantee, one embodiment of a work-conserving scheduler will allocate two-thirds of the extra 25% of the resources to A, and the remaining one-third to B.

However, if a new customer C is added to further share the resource, and C pays for and receives 25% of the resources, the resources actually delivered to A and B will decrease. Although A and B will still receive the 50% and 25%, respectively, of resources that they paid for, A and B may both perceive a decrease in service. In order to avoid setting unrealistic customer expectations, it is preferable for the resource scheduler to prevent customers from receiving more resources than they have paid for, even if this allows resources to be idle during certain times. Such a preferred resource scheduler is non-work-conserving, and implements both minimum and maximum quality of service guarantees.

One existing method for preventing schedulable entities from exceeding their maximum allotted resources is to place a rate controller module into the system before the resource scheduler. The rate controller module receives resource requests from each different schedulable entity and separates them into individual "schedulable entity" queues. Each schedulable entity has a separate queue. Before a request is passed on to the scheduler, the rate controller module checks to determine if granting the request will exceed the schedulable entity's maximum resource allotment. If so, the rate controller module sets a timer to expire when the request may be granted without exceeding the schedulable entity's maximum allotment. Upon timer expiry, the rate controller module allows the request to be passed on to the scheduler, where it will be scheduled for service.

The implementation of the rate controller module requires a separate queue and timer for each schedulable entity, requiring a large amount of memory for storing the state of each timer and checking each timer to see if it has expired. The state space required scales linearly with the number of schedulable entities, and can become burdensome for large numbers of schedulable entities. As the number of resource users, each corresponding to a different schedulable entity, increases, the state space required to manage the scheduler and allocate resources properly increases rapidly.

Thus, it is desirable to provide a system and method for resource scheduling capable of limiting schedulable entities to a certain minimum and maximum resource allocation, without requiring the significant space required by a typical rate controller module. The system should also ensure that resources are shared fairly among the different schedulable entities.

SUMMARY OF THE INVENTION

The present invention schedules resource requests from a plurality of schedulable entities while limiting the maximum and minimum quality of service allocated to each schedulable entity. One embodiment of a scheduler in accordance with the present invention requires less memory to maintain state information than existing rate-controlling schedulers, and is thus more easily scalable to large numbers of users. The scheduler also schedules resources fairly among competing schedulable entities.

A resource scheduler uses a fair-share scheduling algorithm to select resource requests to service from multiple request queues, each associated with a schedulable entity. After a resource request is selected from a queue, a rate controller checks to ensure that servicing the request will not cause the associated user's maximum quality of service to be exceeded. If the maximum quality of service will not be exceeded, the request is serviced and the virtual time is incremented. If the maximum quality of service will be exceeded, the virtual time is still incremented, but the actual request is not serviced and remains pending.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
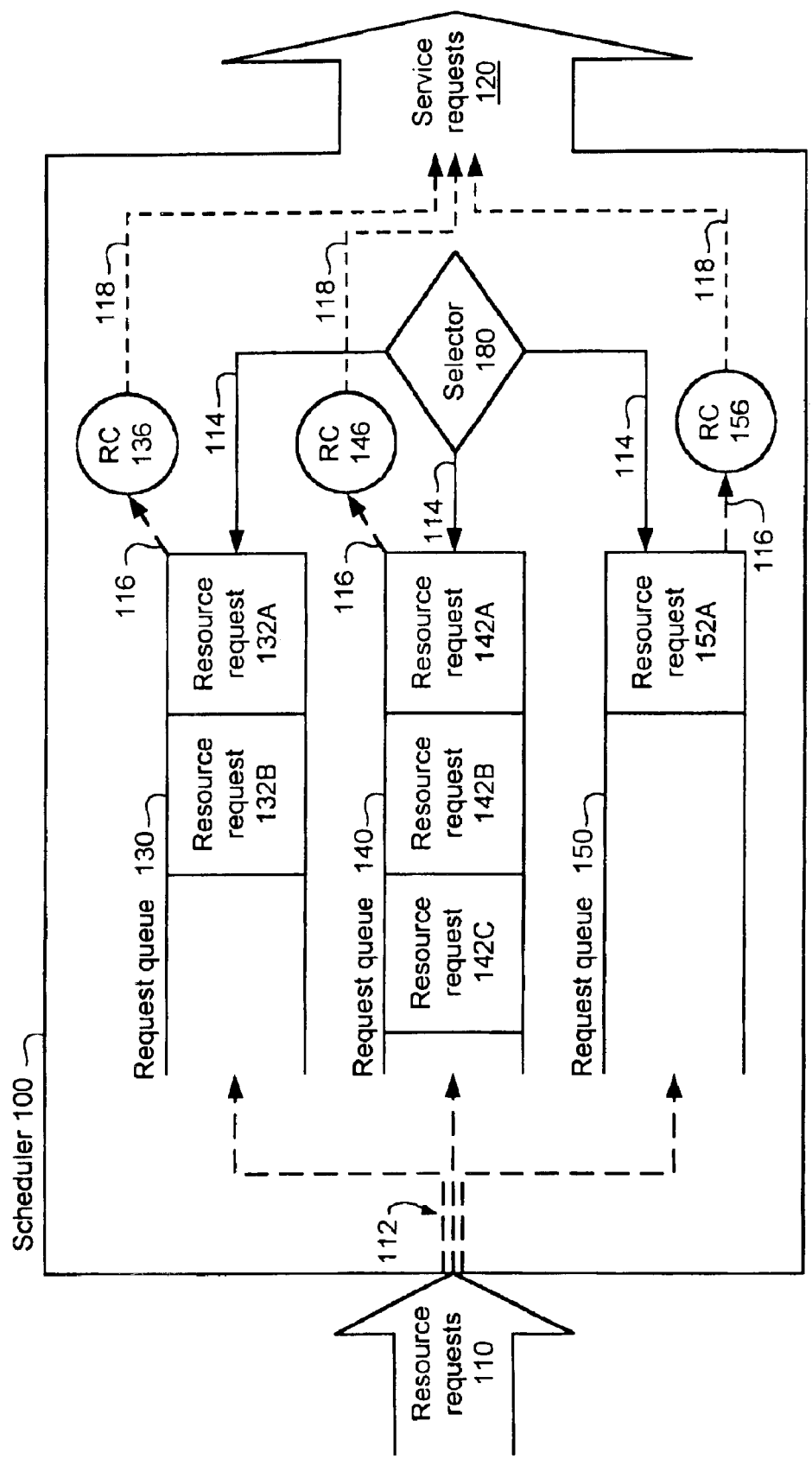
FIG. 1 is an illustration of a resource request scheduler adapted to limit the maximum quality of service allocated to each schedulable entity.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Reference will now be made in detail to several embodiments of the present invention, examples of which are illustrated in the accompanying drawings. Wherever practicable, the same reference numbers will be used throughout the drawings to refer to the same or like parts. Before describing various embodiments of the present invention, some further background on scheduling methods is provided.

Any separately identifiable source of requests for a resource is referred to herein as a "schedulable entity." As examples, a schedulable entity may represent a single individual, a group of individuals with some shared association, a computer or a set of computer programs associated with a resource. For example, a company A may contain two divisions Y and Z. If resource requests, such as requests for network bandwidth, are only identified as originating from company A, company A is a "schedulable entity," and all resource requests from both division Y and division Z are included in the same scheduling queue. However, if company A network bandwidth requests may be separately identified and scheduled between division Y and division Z, then both Y and Z are schedulable entities. Separate qualities of service may be assigned to the different divisions, and requests from each division are placed into separate scheduling queues.

Different quality of service guarantees may be assigned to different types of resources for the same schedulable entity. Many different types of resources may be assigned quality of service guarantees, such as CPU time, memory access time, file access time, and networking resources. Other types of resources will be evident to one of skill in the art. For example, schedulable entity "Entity A" may have a CPU quality of service set to 50% of the physical computer's resources. Entity A may also be assigned only 40% of the physical resource's memory access time. In another embodiment a schedulable entity may have a single quality of service guarantee that applies to each type of resource. For example, Entity A may be assigned a minimum quality of service of 40%, and a maximum quality of service of 50% for all resources. In this case, Entity A will receive between 40 and 50% of all of the resources of the physical computer.

The quality of service assigned to each schedulable entity for each resource type is stored in a quality of service table or similar data structure. The quality of service is expressed as either a minimum and maximum percentage share of resources, or as a minimum and maximum quantity of a particular resource. In one embodiment, the minimum and maximum quality of service are equal, and a single quality of service value bounds the resources allocated to a particular schedulable entity. The present invention does not limit how quality of service parameters are set or selected for entities, and so any mechanism for managing quality of service may be used.

Fair-share scheduling algorithms are well known in the art, and numerous different variations exist. Fair-share scheduling algorithms partition a resource among multiple users such that each user is allocated a fair share of the resource. For purposes of example, the start-time fair queuing algorithm with virtual time scheduling will be discussed herein. However, it will be understood by one of skill in the art that numerous other fair-share scheduling algorithms may be used with the inventive techniques disclosed herein. For example, a round-robin, a deficit round-robin, or a self-clocked fair queuing algorithm may be used.

Certain fair-share scheduling algorithms use various methods to emulate the idealized scheduling discipline of generalized processor sharing (GPS). In GPS, each schedulable entity has a separate queue. The scheduler serves each non-empty queue by servicing an infinitesimally small amount of data from each queue in turn. Each queue may be associated with a service weight, and the queue receives service in proportion to this weight. Weighted fair queuing algorithms simulate the properties of GPS by calculating the time at which a request would receive service under GPS, and then servicing requests in order of these calculated service times. The start-time fair queuing algorithm is a variation of weighted fair queuing.

A virtual time may be used in fair-share scheduling algorithms. A virtual time scheduler increments a virtual time variable. A start and finish tag is calculated for each incoming resource request, and requests are serviced in order of their tags. The is equal to the current request's start tag number, and increments as additional start tags are calculated. A virtual time scheduler simulates time-division multiplexing of requests in much the same way as weighted fair queuing algorithms simulate the properties of GPS. Virtual time scheduling, weighted fair queuing, and the start-time fair queuing algorithm are discussed in "An Engineering Approach to Computer Networking" by S. Keshav, pp. 209–263, (Addison-Wesley Professional Computing Series) (1997), and "Start-time Fair Queuing: A Scheduling Algorithm for Integrated Services Packet Switching Networks" by Pawan Goyal, Harrick M. Vin, and Haichen Cheng, IEEE/ACM Transactions on Networking, Vol. 5, No. 5, pp. 690–704 (October 1997), the subject matter of both of which are hereby incorporated in their entirety.

The start-time fair queuing algorithm is used with virtual time scheduling in the following manner. Incoming resource requests are placed in separate queues within a resource scheduler, with each queue holding the requests from a particular schedulable entity. Each resource request is tagged with both a start number (SN) and a finish number (FN) tag as it reaches the head of its respective queue, and requests are serviced in order of increasing start numbers. The start and finish number tags are calculated for each request k from a schedulable entity i, where i represents the queue in which the request k has been placed. The start and finish number tags are calculated using the virtual time V(t), the weight given to each schedulable entity $\Phi(i)$ (if weighting is being implemented) and the resource duration D(i, k, t) for which each request is scheduled.

The virtual time V(t) is initially zero. When the resource scheduler is busy, the virtual time at time t is defined to be equal to the start tag of the request in service at time t. At the end of a busy period, the virtual time is set to the maximum finish tag assigned to any resource request that has been serviced.

The start number tag SN of a request k arriving at an inactive queue i (one that does not currently contain previous pending requests by the queue's schedulable entity) is set to the maximum of either the current virtual time V(t) or the finish number FN of the previous request (k−1) pending in the queue:

$$SN(i,k,t)=\max[V(t),FN(i,k-1,t)] \quad (1)$$

The finish number tag FN of a request k is the sum of the start number SN of the request and its request duration D(i, k, t) divided by its weight Φ(i):

$$FN(i,k,t)=SN(i,k,t)+D(i,k,t)/\Phi(i) \quad (2)$$

The weight Φ(i) for each schedulable entity corresponds to the minimum quality of service assigned to that schedulable entity. Schedulable entities are provided with resources in proportion to their weights, and thus a schedulable entity with a minimum quality of service guarantee of 40% of a resource receives proportionally more resources than another schedulable entity with a minimum quality of service guarantee of 20% of a resource. As shown in Eq. 2, as Φ(i) increases towards 1 (100% of the resources available), the amount D(i,k,t)/Φ(i) added to the SN decreases, and thus the finish number FN tag is lower for the current request (k−1). As shown in Eq. 1, a lower finish number FN tag on the current request (k−1) causes the next request k to have a lower start number SN tag. A lower SN tag means that the next request k is serviced more quickly. Thus increasing the weight of a particular queue increases the frequency at which requests are serviced from the queue.

In one embodiment, each schedulable entity queue i has an individually assigned minimum quality of service, and thus each schedulable entity is allotted a different proportion of the overall resources. In another embodiment, all of the schedulable entities are allocated the same minimum quality of service guarantee, and weights are not implemented.

The request duration D for which a resource request is scheduled is specific to the type of resource being requested and the particular scheduling system implementation. Request duration D determines the granularity of resource scheduling. For example, assume a process P requires a duration of 100 seconds of CPU time. Scheduling process P continuously for 100 seconds would mean that all other processes would starve for 100 seconds, an undesirable result. Instead, process P will typically be scheduled for a shorter upper bound duration $D_{max}$, such as 20 seconds. After 20 seconds, process P is preempted and another process is scheduled. If the original duration D requested is shorter than the upper bound duration $D_{max}$, the entire requested duration D will be serviced. Additionally, the process may block on I/O earlier than the upper bound duration on CPU time.

Various embodiments of the present invention will next be discussed. FIG. 1 illustrates a scheduler 100 suitable for scheduling the shared usage of a variety of different types of resources. For example, scheduler 100 may be used to schedule resources for CPU time, memory access, disk access, or networking resources such as bus bandwidth. Additional types of resources suitable for scheduling with the scheduler 100 will be evident to one of skill in the art. Different schedulable entities make requests for resources, such as a request for CPU time, a request for memory access, a request for disk access, or a request for bandwidth to transport signals within the network.

Scheduler 100 selects resource requests for service using a fair-share scheduling algorithm. Scheduler 100 additionally prevents a selected resource request from being serviced if the maximum quality of service assigned to the schedulable entity that made the resource request would thereby be exceeded. Scheduler 100 implements rate control over the maximum quality of service in a manner that preserves the fairness properties of the scheduling algorithm. Scheduler 100 further implements rate control in a manner that reduces the memory required to store state variables as compared to prior-art methods. Scheduler 100 may be implemented as part of the operating system of a computer.

Different quality of service guarantees are implemented by allocating different amounts of the scheduled resource to servicing each of the schedulable entities. Resources may be allocated to different schedulable entities as a percentage of a particular resource, for example, allocating 50% of the resource to schedulable entity A and 25% to schedulable entity B. Resources may also be allocated as a particular number of units of a resource, for example, the operating system may be instructed to allocate x seconds of memory access to schedulable entity A and y seconds of memory access to schedulable entity B.

Each schedulable entity has an assigned minimum and maximum quality of service guarantee for the resource being scheduled. The minimum guarantee represents the minimum amount of a particular resource the schedulable entity should receive. The maximum guarantee represents the maximum amount of a particular resource the schedulable entity should receive, and this maximum will be enforced even if the resource will become idle. In one embodiment, the minimum and maximum quality of service guarantees are equal. In another embodiment, the maximum quality of service exceeds the minimum quality of service, for example, schedulable entity A is guaranteed at least 20% of the resource, but at no time will entity A receive more than 30% of the resource.

Scheduler 100 receives incoming resource requests 110 from a group of schedulable entities who share the resource being scheduled. The incoming requests 110 are sorted 112 into separate queues, with each queue holding the pending requests for a single schedulable entity. Three queues 130, 140 and 150 are shown in FIG. 1. Queue 130 holds two pending resource requests 132A and 132B. Queue 140 holds three pending resource requests 142A, 142B, and 142C. Queue 150 holds one pending resource request 152A. It will be evident to one of skill in the art that additional queues may be added to the scheduler 100 if additional schedulable entities are to share the resource being scheduled.

Requests 132A, 142A and 152A reside in the head of queues 130, 140, and 150, respectively. As resource requests are serviced, they leave the head of the queue, and requests remaining in the queue move up in the queue. The fair-share selector 180 selects 114 resource requests for service from the head of each queue based upon a fair-share scheduling algorithm, which ensures that each schedulable entity receives its minimum quality of service. Each resource request is assigned a start number tag SN and finish number tag FN (Eqs. 1 and 2) as it reaches the head of its respective queue. Selector 180 selects the next resource request to service as the one with the lowest SN tag. The fair-share selector 180 will not allocate service time to an empty queue.

If the schedulable entities have equal minimum quality of service guarantees (equal weights), the fair-share scheduling algorithm apportions resources equally among the schedulable entities. If the minimum quality of service guarantees for the schedulable entities differ, each schedulable entity has a weight (i) that is incorporated into the fair-share scheduling algorithm, as shown in Eq. 2. The weight Φ(i) thus influences the tags assigned to each resource request and the resulting selection order of requests.

In the following example, it will be assumed that the scheduler 100 uses the start-time fair queuing algorithm with a virtual clock tracking the virtual time V(t). Selector 180 also limits each selected request to a pre-determined maximum duration $D_{max}$, thereby limiting the amount of resource time allocated to any single request.

As resource requests enter the head of each queue, the scheduler 100 assigns each request a start number tag SN using Eq. 1, and a finish number tag FN using Eq. 2. Selector 180 selects 114 requests for service based upon their start number SN order, with the lowest SN selected first. Ties are broken arbitrarily. Each request includes a request duration $D_{request}$. The request will be scheduled for service for a duration $D=D_{request}$; however, if $D_{request}$ is greater than the scheduler 100's pre-determined upper bound duration $D_{max}$, the selector 180 will only permit $D_{max}$ of the request to be selected for service:

$$D = \min(D_{request}, D_{max}) \quad (3)$$

If $D_{request} > D_{max}$, the remainder of the request ($D_{remainder} = D_{request} - D_{max}$) will be returned to the head of its queue, and a new start number and finish number tag will be calculated for the remainder of the request.

The virtual time V(t) is related to the current request's start number SN. Each time that the selector 180 selects 114 a request for service with a new start number tag SN, this advances the virtual time V(t) of the scheduler 100. As shown in Eq. 1, this calculation of SN depends on the finish number FN calculation given in Eq. 2. A component of the FN calculation is the request duration D(i,k,t), and thus the request duration also influences the virtual time V(t).

Once a request has been selected 114 for service, it is checked 116 by the rate controller for its respective queue. Queue 130 has a rate controller 136, queue 140 has a rate controller 146, and queue 150 has a rate controller 156. Each rate controller checks to determine whether the selected request is eligible for service, i.e. whether servicing the selected request will exceed the maximum quality of service guarantee for the associated queue's schedulable entity. Techniques for determining whether satisfying the current selected request would result in the request's schedulable entity exceeding its pre-specified maximum quality of service are well known in the art. Rate controlled schedulers are discussed in "An Engineering Approach to Computer Networking" by S. Keshav, pp. 248–252, (Addison-Wesley Professional Computing Series) (1997), the subject matter of which is herein incorporated by reference in its entirety.

If servicing the request would exceed the maximum quality of service guarantee, the request is not eligible for service and the rate controller leaves the request pending at the head of its respective queue. However, the rate controller will send a dummy request to be serviced 120 that is scheduled for a zero time duration D, thereby updating the virtual time. The SN and FN tags for the request left pending at the head of the non-eligible queue will thus be recalculated as if the request had just arrived at the head of the queue. This SN and FN tag recalculation occurs both for requests that are not eligible for service, and for request remainders as discussed previously.

If the rate controller determines that the request is eligible for service, the request is removed 118 from its queue. The request is then serviced 120, meaning that the request is allowed to consume the resource being scheduled for a duration D.

Scheduler 100 employs rate controllers 136, 146 and 156 to ensure that each schedulable entity does not exceed its maximum quality of service guarantee. The rate controllers do not require a separate set of rate controller queues, nor does each rate controller require a separate timer. Thus, the rate controllers require less memory for state variable storage as compared to prior-art rate control mechanisms.

Figure 2:
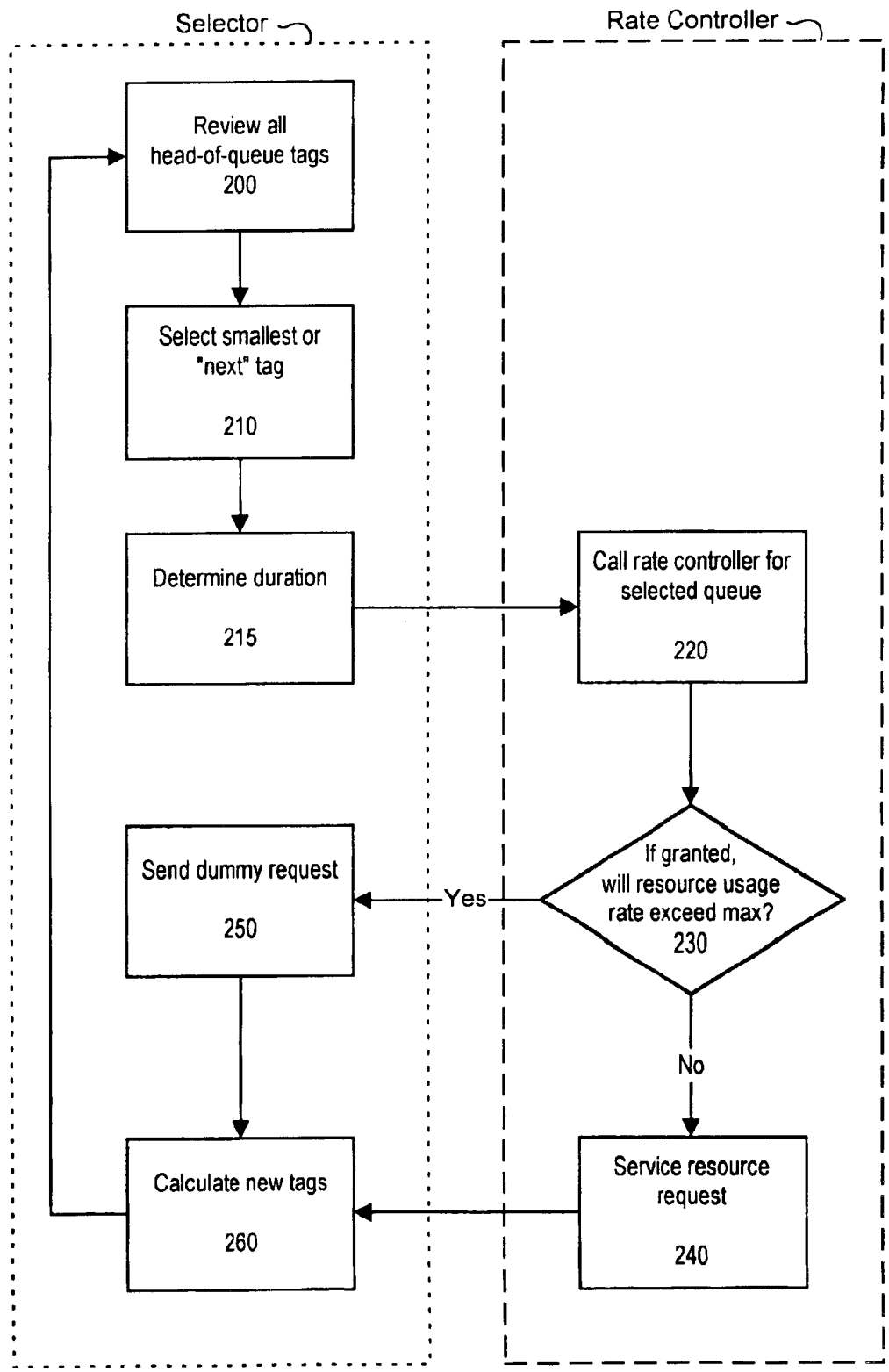
FIG. 2 is a flowchart of the process for selecting and servicing requests from schedulable entities while limiting the maximum quality of service allocated to each schedulable entity.

FIG. 2 is a flowchart of the process for selecting and servicing resource requests as implemented within a resource scheduling module, such as the scheduler 100. The method of FIG. 2 will be illustrated by an example of scheduling a CPU resource using scheduler 100 of FIG. 1. For purposes of example, assume that the CPU resource's $D_{max}$ is 20 seconds. The SN tag, and $D_{request}$ associated with each head-of-queue resource request is given in Table 1 below:

TABLE 1

| SN tag | Resource request | $D_{request}$ (seconds) |
| --- | --- | --- |
| 1 | 132A | 50 |
| 3 | 142A | 20 |
| 6 | 152A | 30 |

The scheduler reviews 200 the SN tags for the head-of-queue requests (132A, 142A, and 152A). The scheduler selects 210 the resource request with the smallest or "next" SN tag (132A). In one embodiment, ties are broken arbitrarily. In another embodiment, the system administrator specifies an order for resolving tag number ties. The scheduler then determines 215 the duration D to allot to the selected resource request. In this example, since $D_{request} > D_{max}$ (50 seconds > 20 seconds), the request 132A will only be granted $D_{max}$ (20 seconds) of CPU time.

The rate controller (136) associated with the queue of the selected request (132A) is called 220. The rate controller determines 230 whether servicing the selected request will exceed the maximum quality of service guarantee allocated to the request's schedulable entity. If the maximum quality of service will be exceeded, the scheduler sends a dummy request 250 for servicing, thereby simulating servicing the request within the fair-share scheduling algorithm controlling the request selection process. The virtual time V(t) then advances to the SN tag of the next request, just as if the request 132A had actually been serviced. If the maximum quality of service will not be exceeded, the resource request is actually serviced 240.

The scheduler then calculates 260 new tags as needed. If the entire requested duration $D_{request}$ of the selected request (132A) was serviced 240, resource request 132B moves to the head of queue 130 and a new SN and FN tag is assigned to request 132B. However, if the entire request or part of the request (132A) was not serviced and is still pending, new tags are calculated for the portion of request 132A that was not serviced. In this example, 30 seconds of original request 132A remain to be serviced. The remainder of request 132A with an updated duration $D_{request}$ of 30 seconds remains pending in the queue 130. New SN and FN tags are calculated for the remainder of request 132A, and request 132B remains back in the queue 130.

The scheduler then returns to step 200 and reviews the head-of-queue SN tags to select the next request for service.

The fair-share scheduling system and method described in FIGS. 1 and 2 may also be implemented in a hierarchical fair-share scheduler. A hierarchical fair-share scheduler performs fair-share scheduling on multiple levels, i.e. schedulable entity groups may have subgroups that also have weights. A set of start number and finish number tags are maintained at each level of the hierarchy. The hierarchical fair-share scheduler is implemented as a tree structure, where each node is a scheduler that partitions the resource allocated to it and schedules child nodes. A hierarchical fair-share scheduler is discussed in "Start-time Fair Queuing: A Scheduling Algorithm for Integrated Services Packet Switching Networks" by Pawan Goyal, Harrick M. Vin, and Haichen Cheng, IEEE/ACM Transactions on Networking, Vol. 5, No. 5, pp. 690–704 (October 1997), the subject matter of which is incorporated herein in its entirety.

A hierarchical fair-share scheduler may be used, for example, if a particular parent schedulable entity wishes to allocate a certain percentage of the parent's total resources to a first child schedulable entity, and allocate the remainder to a second schedulable entity. For example, assume Company A requests that a minimum of 40% of the resources of a particular CPU be guaranteed for the Company A, and Company A is prohibited from using more than 45% of the resources. Company A also wishes to ensure that its Division X receives at least 60% of the Company A CPU resources, and that its Division Y receives the remainder of the resources.

The hierarchical resource scheduler will constrain Company A to using between 40 and 45% of the available resources of the shared CPU, using a weighted fair-share queuing algorithm and rate controllers as described in FIGS. 1 and 2 to implement the desired minimum and maximum quality of service. Company A, however, may request that the resource scheduler implement one of several different methods for resource sharing between Divisions X and Y. In one embodiment, Divisions X and Y are assigned resources using a non-work-conserving scheduling algorithm wherein both X and Y are constrained to a minimum and a maximum quality of service. In another embodiment, Divisions X and Y are assigned resources using a work-conserving scheduling algorithm wherein both X and Y are guaranteed a minimum quality of service, and any additional resources are shared between X and Y according to their respective weights.

Figure 3:
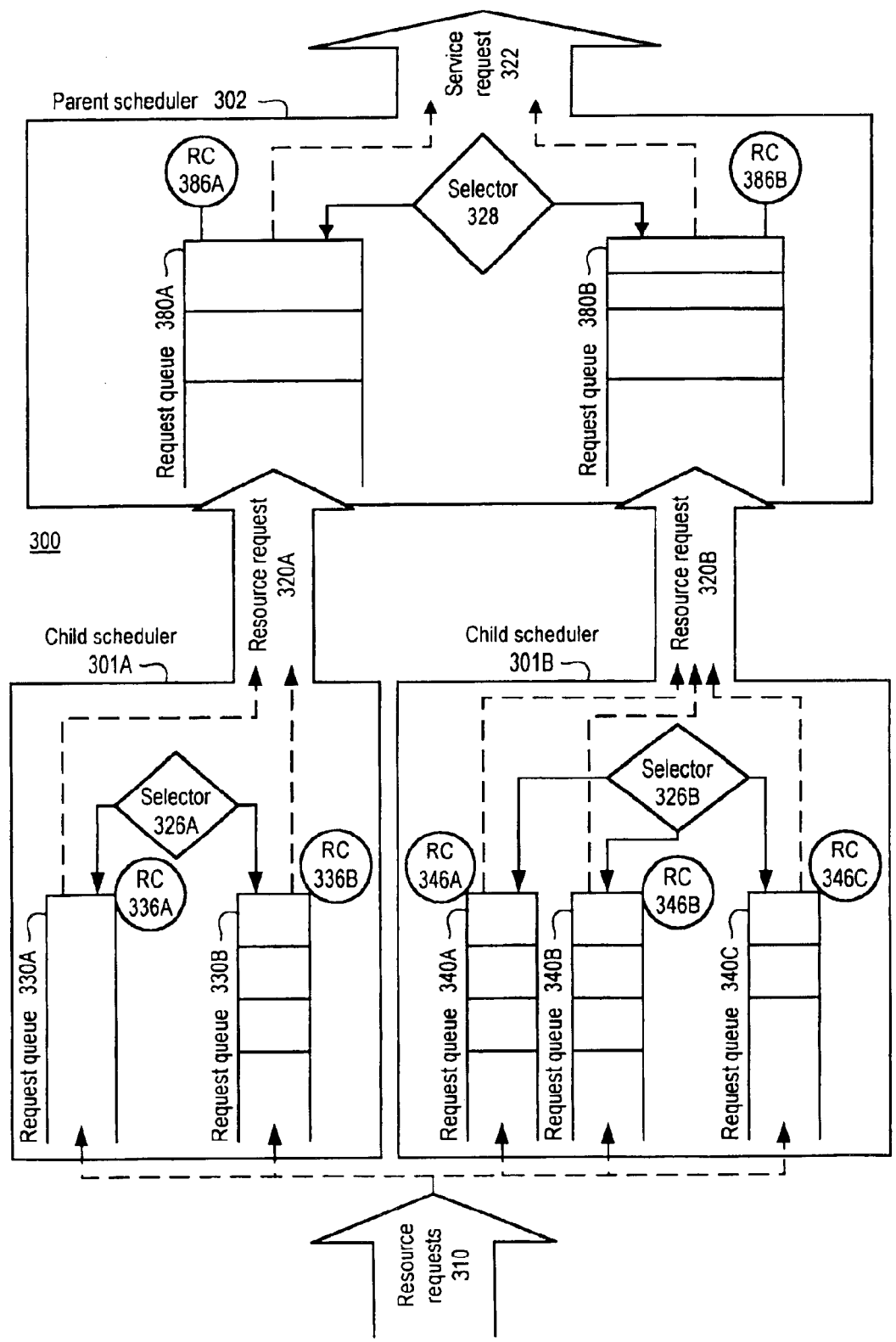
FIG. 3 is an illustration of a hierarchical resource request scheduler adapted to limit the maximum quality of service allocated to each schedulable entity.

FIG. 3 illustrates a hierarchical fair-share scheduler 300. A parent scheduler 302 has two child schedulers 301A and 301B. Parent scheduler 302 includes two parent queues 380A and 380B, corresponding to two schedulable entities. Child scheduler 301A includes two child queues 330A and 330B, corresponding to two schedulable entities, both of which feed resource requests 320A to parent queue 380A. Child scheduler 301B includes three child queues 340A, 340B and 340C, all of which feed resource requests 320B to parent queue 380B. Each parent queue represents a main schedulable entity (such as a company), and each child queue represents a subgroup schedulable entity of its parent (such as a division of the company).

Initial resource requests 310 are separated by child schedulable entity and placed into their corresponding child queues 330 or 340. Child schedulers 301A and 301B assign start and finish number tags to requests in the heads of their respective queues. Each child scheduler 301 maintains a separate set of tags, and the parent scheduler 302 also maintains a separate set of tags. Consequently, each scheduler has a separate virtual time clock. Selector 326A selects resource requests for service from requests at the head of queues 330A and 330B using a fair-share scheduling algorithm. Selector 326B also selects resource requests for service from requests at the head of queues 340A, 340B and 340C using a fair-share scheduling algorithm.

In one embodiment, each child queue is assigned a weight $\Phi(i)$ increasing or decreasing the queue's relative resource share. Each child queue also has an associated rate controller that limits the maximum resource share that that child queue may obtain. Child queue 330A has a rate controller 336A; child queue 330B has a rate controller 336B; child queue 340A has a rate controller 346A; child queue 340B has a rate controller 346B; and child queue 340C has a rate controller 346C. When a request from the head of a child queue is selected for service, the associated rate controller determines if servicing the request will exceed the maximum quality of service allocated to the child queue. If the maximum quality of service will be exceeded, a dummy request for zero resources is sent for service as a placeholder, and the request remains pending in the head of its child queue. Start and finish number tags are updated as described previously, thereby incrementing the virtual time for the scheduler.

Requests (including dummy requests) selected for service by selector 326A that are not blocked by their respective rate controllers are output 320A into queue 380A of scheduler 302.

Similarly, requests selected for service by selector 326B that are not blocked by their respective rate controllers are output 320B into queue 380B of scheduler 302. Scheduler 302 assigns new start and finish number tags to requests in queues 380A and 380B, thereby incrementing the virtual time for the parent scheduler 302. A selector 328 uses a fair-share scheduling algorithm to select requests for service from the heads of queues 380A and 380B. Queue 380A has an associated rate controller 386A, and queue 380B has an associated rate controller 386B. Scheduler 302 uses the method described in FIG. 2 to output resource requests for servicing 322, subject to minimum and maximum quality of service constraints on queues 380A and 380B.

In the embodiment shown in FIG. 3, child schedulers 301A and 301B are implemented in a manner similar to the parent scheduler 302. In another embodiment, the hierarchical resource scheduler 300 implements one or more of the child schedulers 301A and 301B differently than parent scheduler 302. For example, child schedulers 301A and/or 301B may be implemented without rate controllers associated with each child queue. A child queue without a rate controller will not be subject to a maximum quality of service limitation. Additionally, child schedulers 301A and/or 301B may be implemented as work-conserving schedulers, or may use different types of scheduling algorithms.

The resource scheduling method of the present invention is suitable for use in scheduling the resources of "virtual servers." It is desirable for an ISP to provide multiple server applications on a single physical host computer, in order to allow multiple customers to use a single host computer. If a different customer is associated with each server application, or "virtual server", the ISP will implement a method of sharing resources between customers. Additionally, it is desirable to be able to constrain virtual server customers to a minimum and maximum quality of service guarantee. This allows customers to be limited to a certain amount of the resources of the physical host computer.

The resource scheduler of the present invention may be used in the context of virtual servers to schedule some or all of the physical host computer resources. Each virtual server corresponds to a separate schedulable entity. Each virtual server is assigned a maximum and minimum quality of service guarantee. In another embodiment, separate maximum and minimum quality of service guarantees may be assigned to different resources used by the same virtual server. Requests for resources from each virtual server are serviced according to the resource scheduling method of the present invention.

Although the invention has been described in considerable detail with reference to certain embodiments, other embodiments are possible. As will be understood by those of skill in the art, the invention may be embodied in other specific forms without departing from the essential characteristics thereof. For example, different fair-share algorithms may be implemented in the resource request scheduler. Additionally, a weighted fair-share or hierarchical weighted fair-share algorithm implementation may be used in the resource request scheduler. Accordingly, the present invention is intended to embrace all such alternatives, modifications and variations as fall within the spirit and scope of the appended claims and equivalents.

We claim:

1. A method for scheduling resource requests from a plurality of schedulable entities, wherein each resource request includes a requested duration and each schedulable entity has a maximum resource allocation, the maximum resource allocation being specified as a maximum quality of service guarantee, the method comprising:

assigning a start number tag to a each resource request using a start-time fair queuing algorithm with virtual time scheduling;

selecting a resource request with the smallest start number tag, the selected resource request having an associated schedulable entity;

limiting the requested duration of the selected resource request to a pre-determined duration upper bound;

servicing the selected resource request if servicing the selected resource request will not exceed the associated schedulable entity's maximum quality of service guarantee; and advancing a virtual time value.

2. The method of claim 1, further including updating the start number tag for a resource request associated with the schedulable entity that made the selected resource request is not serviced.

3. The method of claim 1, further including leaving the selected resource request pending if servicing the selected resource request will exceed the schedulable entity's maximum quality of service guarantee.

* * * * *

UNITED STATES PATENT AND TRADEMARK OFFICE
CERTIFICATE OF CORRECTION

PATENT NO. : 6,909,691 B1
DATED : June 21, 2005
INVENTOR(S) : Pawan Goyal et al.

It is certified that error appears in the above-identified patent and that said Letters Patent is hereby corrected as shown below:

Title page,
Item [56], References Cited, OTHER PUBLICATIONS, please insert:
-- Goyal, P., Vin, H. M.; "Generalized Guaranteed Rate Scheduling Algorithms: A Framework," IEEE/ACM Transactions on Networking, Vol. 5, Issue 4, August 1997; Pages 561-571 --.
Item [57], ABSTRACT,
Line 5, please delete "memory maintain" and insert -- memory to maintain --.

Column 11,
Line 21, please delete "to a each" and insert -- to each --.

Column 12,
Line 13, after "that made the selected resource request" and before "is" please insert -- if the selected resource request --.

Signed and Sealed this

Thirtieth Day of August, 2005

JON W. DUDAS
*Director of the United States Patent and Trademark Office*